United States Patent
Kim (10) Patent No.: US 8,363,154 B2
(45) Date of Patent: Jan. 29, 2013

(54) FOCUS ERROR ADJUSTING APPARATUS AND METHOD IN DIGITAL IMAGE PROCESSING DEVICE

(75) Inventor: Young-geol Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 276 days.

(21) Appl. No.: 12/468,218

(22) Filed: May 19, 2009

(65) Prior Publication Data

US 2009/0295980 A1    Dec. 3, 2009

(30) Foreign Application Priority Data

May 30, 2008  (KR) .................. 10-2008-0051068

(51) Int. Cl.
G03B 13/00 (2006.01)
H04N 5/232 (2006.01)
(52) U.S. Cl. .................. 348/354; 348/345; 348/353
(58) Field of Classification Search ........... 348/354–356
See application file for complete search history.

(56) References Cited

U.S. PATENT DOCUMENTS

| | | | |
|---|---|---|---|
| 6,954,233 B1 | 10/2005 | Ito | |
| 2006/0171699 A1 | 8/2006 | Nakai et al. | |
| 2006/0238641 A1* | 10/2006 | Konishi | 348/349 |
| 2007/0071433 A1 | 3/2007 | Kawanami | |
| 2008/0055751 A1* | 3/2008 | Morimoto | 359/823 |
| 2008/0118238 A1 | 5/2008 | Sogawa et al. | |
| 2010/0067887 A1* | 3/2010 | Nakai et al. | 396/48 |

FOREIGN PATENT DOCUMENTS

| | | |
|---|---|---|
| CN | 1856021 A | 11/2006 |
| CN | 1940700 A | 4/2007 |
| CN | 101112079 A | 1/2008 |
| CN | 101135828 A | 3/2008 |
| EP | 1 351 086 A2 | 10/2003 |
| EP | 1 519 570 A2 | 3/2005 |
| EP | 1 638 320 A2 | 3/2006 |
| EP | 1 921 845 A2 | 5/2008 |
| JP | 2002-122778 A | 4/2002 |
| JP | 2004-309866 A | 11/2004 |
| JP | 2005-308960 A | 11/2005 |

OTHER PUBLICATIONS

Examination Report established for GB 0904740.8 (Feb. 6, 2012).
Examination Report established for GB 0904740.8 (Jun. 8, 2012).
Examination Report established for GB 0904740.8 (Oct. 12, 2012).
Office Action established for CN 200910134356.3 (Aug. 17, 2012).

* cited by examiner

Primary Examiner — Jordan Schwartz
(74) Attorney, Agent, or Firm — Drinker Biddle & Reath LLP (57) ABSTRACT

Provided are a digital image processing device and an operation method therefor, and more particularly, a focus error adjusting apparatus and a method therefor whereby a focus error can be adjusted when a digital image processing device is manufactured or used. The focus error adjusting apparatus includes a photographing unit photographing a first image whose focus is adjusted, and photographing a plurality of images by changing movement values of a focus motor by referring to the first image; and a digital signal processing unit outputting a focus motor control signal to the photographing unit for the photographing, detecting an image having the greatest evaluation value of a high frequency component from among the first image and the plurality of images, and adjusting movement of the focus motor by as little as a variation value of the focus motor with respect to the image having the greatest evaluation value of the high frequency component.

18 Claims, 5 Drawing Sheets

FOCUS ERROR ADJUSTING APPARATUS AND METHOD IN DIGITAL IMAGE PROCESSING DEVICE

CROSS-REFERENCE TO RELATED PATENT APPLICATION

This application claims the benefit of Korean Patent Application No. 10-2008-0051068, filed on May 30, 2008, in the Korean Intellectual Property Office, the entire disclosure of which is incorporated herein by reference.

BACKGROUND OF THE INVENTION

1. Field of the Invention

The present invention relates to a digital image processing device and an operation method therefor, and more particularly, to a focus error adjusting apparatus and method, whereby a focus error in a digital image processing device can be adjusted during manufacture or use thereof.

2. Description of the Related Art

High-grade digital single lens reflex (DSLR) digital image processing devices are now more frequently used than standard-grade compact counterparts.

Currently, a phase detection system using through-the-lens (TTL) measurement is used in a DSLR digital image processing device. The phase detection system is advantageous due to its fast speed and accuracy compared to a contrast detection system using a live-view mode.

Although the phase detection system is fast and accurate, focus can deviate due to mechanical errors during manufacture of the system, or mechanical shocks during use. Two methods are mainly used to adjust focus errors caused by mechanical errors or shocks. In the first method, the focus error is directly, mechanically adjusted and the result of the adjustment process is verified. In the second method, software parameters related to the focus error are adjusted and the result of the adjustment process is verified.

Both methods have disadvantages. In the case of the first method, a user has to directly manipulate a mechanical device (e.g., a mirror), and thus the digital image processing device may be damaged. In the case of the second method, a user has to make firmware changes, which may result in firmware problems, such as memory leaks.

In more-advanced focus adjusting techniques, a user can adjust a focus error by manually adjusting parameters via a user interface (UI). However, such techniques are used by a limited number of digital image processing devices, and users must directly visually verify whether the focus error is accurately adjusted. Thus, user convenience is low.

SUMMARY OF THE INVENTION

The present invention provides a focus error adjusting apparatus and method, whereby a focus error due to a phase detection system is adjusted using a contrast detection method so that the focus error can be easily and accurately adjusted when a digital image processing device is manufactured or used.

According to an aspect of the present invention, there is provided a focus error adjusting apparatus in a digital image processing device, the focus error adjusting apparatus including a photographing unit and a digital signal processing unit. The photographing unit comprises a focus motor and an image sensor for capturing a first image, a second image, and a plurality of additional images. The digital signal processing unit comprises a control unit that receives the first image and the second image from the image sensor, evaluates the first image and the second image to detect a high-frequency component, and sends an output control signal to adjust the focus motor of the photographing unit to a position associated with the image having the higher high-frequency component.

According to another aspect of the invention, there is provided a focus error adjusting apparatus in a digital image processing device, the focus error adjusting apparatus including a photographing unit and a digital signal processing unit. The photographing unit captures a first image whose focus is adjusted, and photographs a plurality of images by changing movement values of a focus motor by referring to the first image. The digital signal processing unit outputs a focus motor control signal to the photographing unit for the photographing, detects an image having the greatest evaluation value of a high frequency component from among the first image and the plurality of images, and adjusts a movement of the focus motor by as little as a variation value of the focus motor with respect to the image having the greatest evaluation value of the high frequency component.

When the first image is photographed, the digital signal processing unit may output a control signal for adjusting a focus via a phase detection system.

The digital signal processing unit may move the focus motor in a direction and an opposite direction by referring to the first image, and may output a control signal to the photographing unit which photographs the plurality of images.

The digital signal processing unit may output a control signal by which the focus motor is moved by as little as a minimum step.

When the image having the greatest evaluation value of the high frequency component is the first image, the digital signal processing unit may set the variation value of the focus motor to 0, and when the image having the greatest evaluation value of the high frequency component is not the first image, the digital signal processing unit may adjust movement of the focus motor by as little as the variation value of the focus motor with respect to the image having the greatest evaluation value of the high frequency component.

The evaluation value of the high frequency component may be a focus peak value calculated by using a contrast detection method with respect to the first image and the plurality of images.

The digital signal processing unit may include a focus adjusting unit for adjusting a focus of the first image; a focus motor control unit controlling movement of the focus motor; a focus value calculation unit for calculating the focus peak value from the first image and the plurality of images; and a control unit adjusting movement of the focus motor by as little as a variation value of the focus motor with respect to an image having a greatest focus peak value when the image having the greatest focus peak value is not the first image.

The control unit may reset a reference image to be the image having the greatest focus peak value, may control photographing of an image by changing movement values of the focus motor by referring to the reset reference image, and may adjust a movement of the focus motor by as little as the variation value of the focus motor with respect to the image having the greatest focus peak value.

The control unit may repeat the reset of the reference image, and may repeat the photographing of the image according to the movement of the focus motor, until the image having the greatest focus peak value becomes the reference image.

According to another aspect of the present invention, there is provided a method of adjusting a focus error in a digital image processing device, the method including (a) photographing a first image whose focus is adjusted; (b) photographing a plurality of images by changing movement values of a focus motor by referring to the first image; (c) detecting an image having the greatest evaluation value of a high frequency component from among the first image and the plurality of images; and (d) adjusting a movement of the focus motor by as little as a variation value of the focus motor with respect to the image having the greatest evaluation value of the high frequency component.

(a) may include the operation of adjusting a focus of the first image via a phase detection system, and photographing the first image.

(b) may include (b-1) moving the focus motor in a direction by referring to the first image, and photographing the plurality of images; and (b-2) moving the focus motor in an opposite direction by referring to the first image, and photographing the plurality of images.

The focus motor may be moved by as little as a minimum step.

(c) may include the operation of using a contrast detection method with respect to the first image and the plurality of images, and detecting an image having the greatest evaluation value of a high frequency component.

In (d), when the image having the greatest evaluation value of the high frequency component is the first image, the variation value of the focus motor may be determined to be 0, and the adjusting may be ended.

When the image having the greatest evaluation value of the high frequency component is not the first image, (d) may include (d-1) resetting a reference image to the image having the greatest evaluation value of the high frequency component; (d-2) photographing an image by changing movement values of the focus motor by referring to the reset reference image; and (d-3) adjusting movement of the focus motor by as little as the variation value of the focus motor with respect to the reference image having the greatest evaluation value of the high frequency component.

(d-1) and (d-2) may be repeated until the image having the greatest evaluation value of the high frequency component becomes the reference image.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 1:
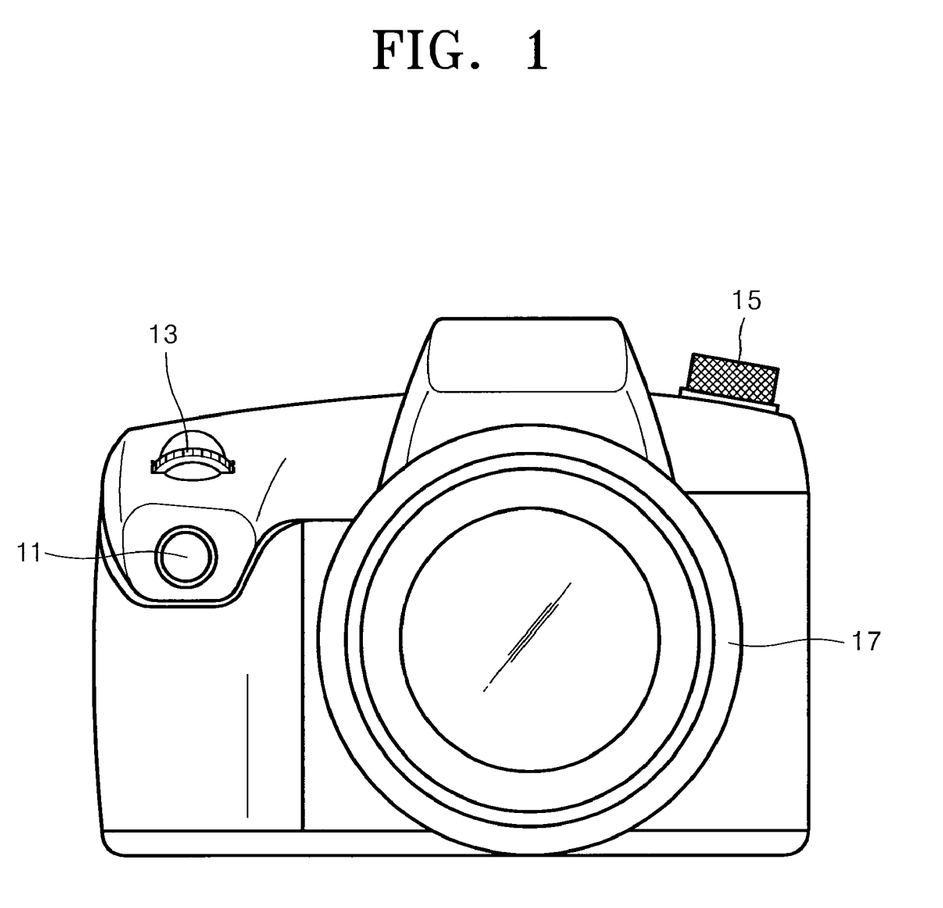
FIG. 1 is an example of a front view of a digital image processing device.

FIG. 1 is an example of a front view of a digital image processing device.

Referring to FIG. 1, a shutter-release button 11, a jog dial 13, a mode dial 15, and a lens unit 17 are arranged in the front area of the digital image processing device.

The shutter-release button 11 opens and closes to expose an image pick-up device (e.g., a charge coupled device (CCD) or a complementary metal-oxide semiconductor (CMOS)) to light during a predetermined period of time. The shutter-release button 11 operates in conjunction with an aperture (not shown) to appropriately expose an object, and records an image in the image pick-up device.

The first shutter-release button 11 generates first and second image photographing signals according to a user input. When the first shutter-release button 11 is half-pressed, the digital image processing device performs focusing, and adjusts amount of light. When the focusing is accurate, a green light is turned on in a display unit 25 (refer to FIG. 2). If the focusing is accurate and the amount of light is adjusted by the input of the half-pressed first shutter-release button 11, a second shutter-release button 11 is fully-pressed so that an image is photographed.

A user uses the jog dial 13 so as to specify setting values, while watching a viewfinder or the display unit 25. Shutter speeds, aperture values, and the like can be set by using the jog dial 13.

The mode dial 15 is manipulated to select a photographing mode. If the digital image processing device is a DSLR or a high-end digital image processing device, the mode dial 15 supports an AUTO (auto photographing) mode that reduces the number of user settings and is used when fast and convenient photographing is required, a SCENE mode that is used to simply set optimized camera settings according to a photographing situation or a target object status, an EFFECT mode that allows particular effects such as continuous photographing, scene photographing, and the like, and an Aperture-priority auto/Shutter-priority auto/Manual (A/S/M) mode that is used to manually set various functions including aperture speeds, shutter speeds, and the like, and to photograph an image, however the present invention is not limited thereto. Besides the aforementioned modes, the mode dial 15 in high-end digital image processing devices further supports a moving picture photographing mode that is used to photograph and store a moving picture during a period of time allowed by a storage space such as a memory card, and a voice recording mode that is used to record and store only voice during the period of time allowed by the storage space.

The lens unit 17 receives light from an external light source, and processes an image.

Figure 2:
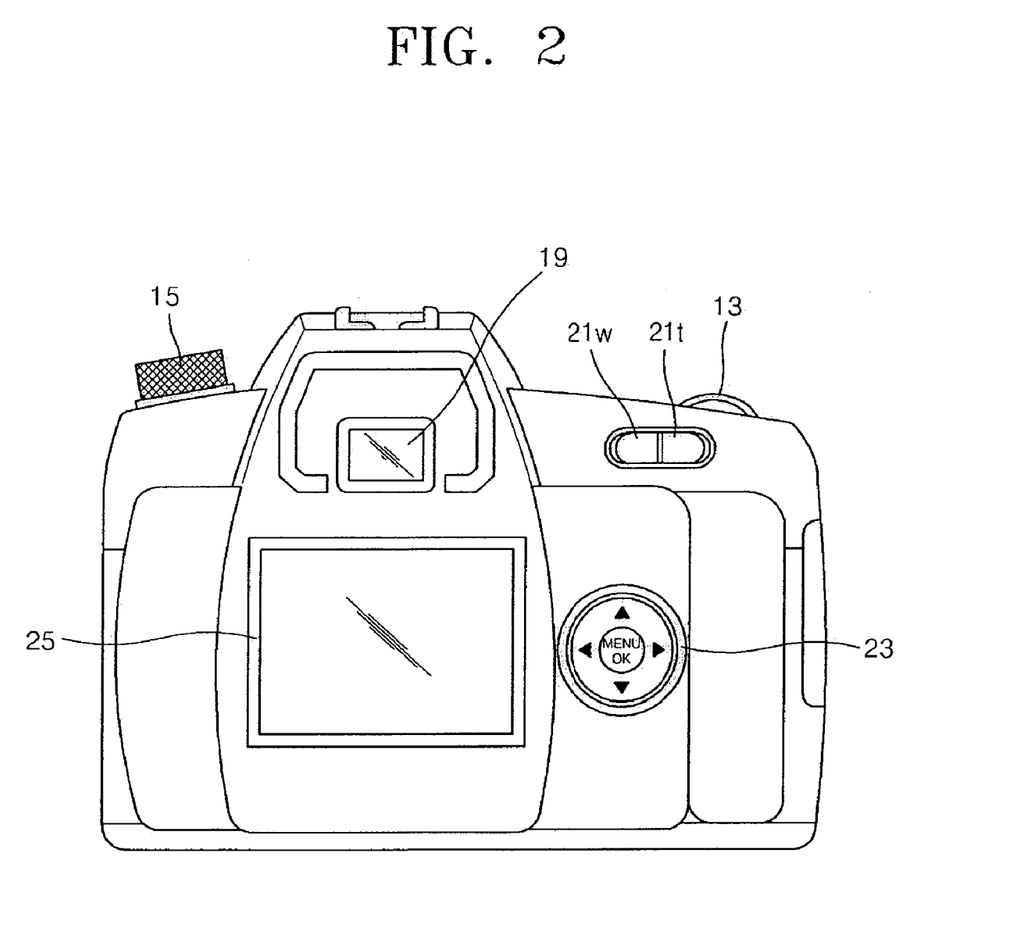
FIG. 2 is an example of a rear view of a digital image processing device.

FIG. 2 is an example of a rear view of a digital image processing device.

Referring to FIG. 2, a viewfinder eyepiece unit 19, a wide angle-zoom button 21w, a telephoto-zoom button 21t, a function button 23, and a display unit 25 are arranged in the rear area of the digital image processing device.

The viewfinder eyepiece unit 19 is a small window for watching and framing a target object.

In the case of high-end digital image processing devices, an angle of view becomes wider or smaller according to an input of the wide angle-zoom button 21w or the telephoto-zoom button 21t. In particular, the wide angle-zoom button 21w or the telephoto-zoom button 21t may be input to change a size of a selected exposure area. When the wide angle-zoom button 21w is input, the size of the selected exposure area becomes wider. When the telephoto-zoom button 21t is input, the size of the selected exposure area becomes narrower.

The function button 23 includes 5 buttons: an up-button, a down-button, a left-button, a right-button, and a menu/OK button. The function button 23 is manipulated to execute various kinds of menu operations of the digital image processing device. Each of the 5 buttons may be used as a shortcut key, and the function button 23 may have different structures according to manufacturers.

Figure 3:
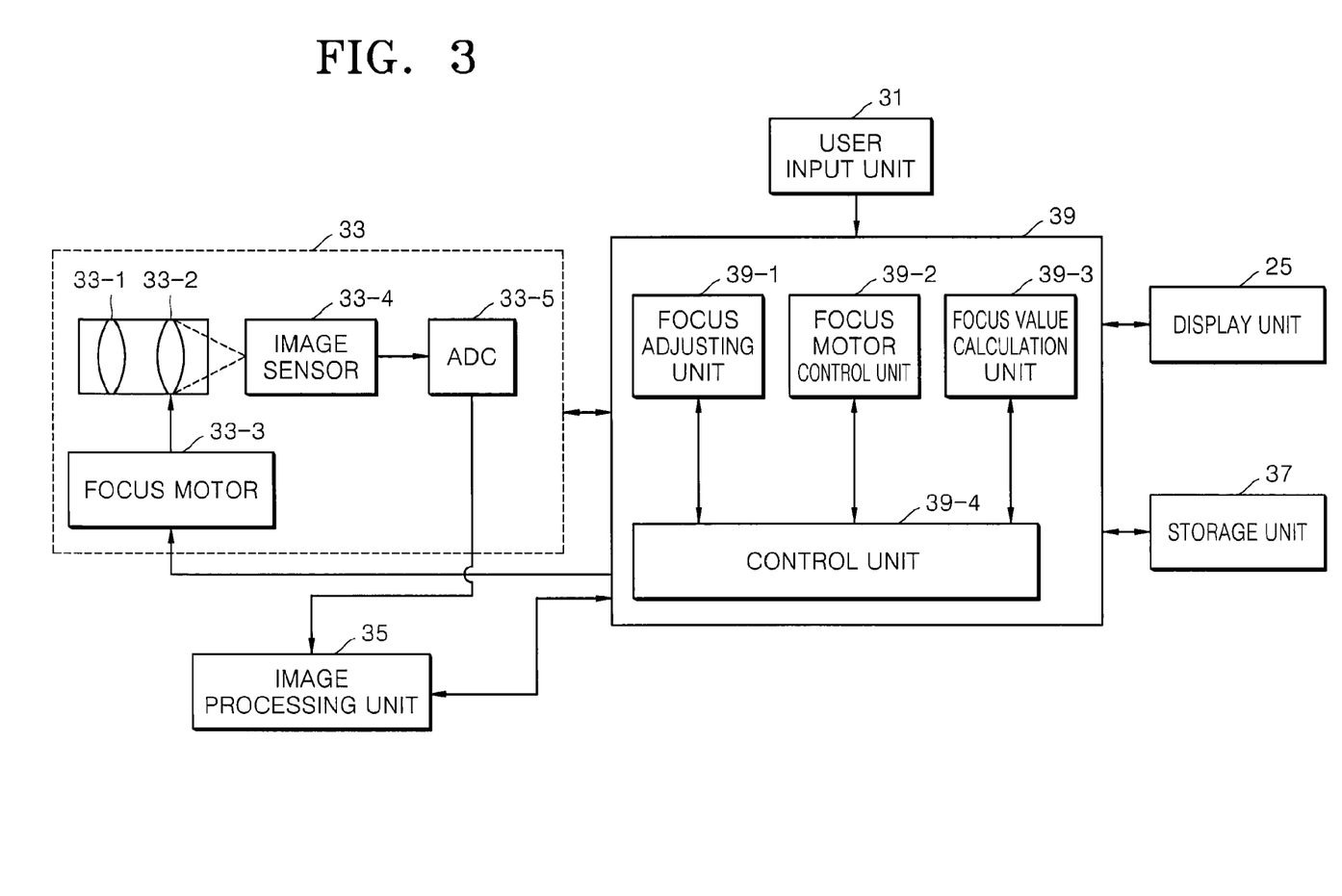
FIG. 3 is a block diagram of the configuration of a focus error adjusting apparatus in a digital image processing device, according to an embodiment of the present invention.

FIG. 3 is a block diagram of a configuration of a focus error adjusting apparatus in a digital image processing device, according to an embodiment of the present invention.

Referring to FIG. 3, the focus error adjusting apparatus includes a display unit 25, a user input unit 31, a photographing unit 33, an image processing unit 35, a storage unit 37, and a digital signal processing unit 39.

Referring to FIGS. 1, 2, and 3, the user input unit 31 may be the same as the shutter-release button 11 that opens and closes to expose an image pick-up device to light during a predetermined period of time, or may be the same as the jog dial 13 that is manipulated to set shutter speeds, and aperture values, and to select desired thumbnail images which are being displayed at one time. If the digital image processing device is of a high-end type, the user input unit 31 may be the same as the mode dial 15 that is input to select a photographing mode, or may be the same as the wide angle-zoom button 21*w* or the telephoto-zoom button 21*t* that enables the angle of view to be wider or smaller according to an input. If the digital image processing device is of a DSLR type, the digital image processing device may not include buttons like the wide angle-zoom button 21*w* or the telephoto-zoom button 21*t* since a zoom operation is manually performed. Also, the user input unit 31 may be the same like the function button 23 that is input to execute various kinds of menu operations of the digital image processing device.

The photographing unit 33 includes a zoom lens 33-1, a focus lens 33-2, a focus motor 33-3, an image sensor 33-4, an analog-to-digital converter (ADC) 33-5, a shutter (not shown), and an aperture (not shown).

The shutter and the aperture adjust an amount of light. The zoom lens 33-1 and the focus lens 33-2 receive light from an external light source, and process an image. At this time, the aperture adjusts an amount of incident light (light intensity) by being opened and closed. The opening and closing of the aperture is controlled by the digital signal processing unit 39.

Optical axes of the zoom lens 33-1 and the focus lens 33-2 are arranged to meet a vertical line extending from a center of a light-receiving surface of the image sensor 33-4. The focus lens 33-2 is arranged to perform linear movement in forward and backward direction along an optical axis, and changes a focal position of an image formed on the light-receiving surface of the image sensor 33-4, according to a moving position of the focus lens 33-2. The moving position of the focus lens 33-2 is controlled by the digital signal processing unit 39 via the focus motor 33-3.

The image sensor 33-4 accumulates the amount of light input via the zoom lens 33-1 and the focus lens 33-2, and according to the accumulated amount of light, outputs an image photographed by the zoom lens 33-1 and the focus lens 33-2, in synchronization with a vertical synchronization signal. Image pick-up in the digital image processing device is performed by the image sensor 33-4 that converts light reflected from a target object into an electrical signal. In order to pick-up a color image by using the image sensor 33-4, a color filter is necessary, and in this regard, a color filter array (CFA) filter (not shown) is generally used. The CFA filter only filters light representing one color per each pixel, has a regularly arranged structure, and has various forms according to the arranged structure. The ADC 33-5 converts an analog image signal output from the image sensor 33-4 into a digital image signal.

The image processing unit 35 performs signal processing on digitized raw data so that the digitized raw data can be displayed. The image processing unit 35 removes a black level caused by a dark current that is generated in the image sensor 33-4 and the CFA filter which are susceptible to temperature variation. Also, the image processing unit 35 performs a gamma correction in which information is encoded in accordance with nonlinearity of human perception, a CFA interpolation in which a Bayer pattern, representing an RGRG line and a GBGB line which are gamma corrected data, is interpolated into an RGB line, an edge compensation in which an interpolated RGB signal is converted to a YUV signal, and a Y signal is filtered by a high-pass filter so that an image becomes clear, an image processing operation in which color values of U and V signals are corrected by using a standard calorimetric system and noises of the U and V signals are removed. The image processing unit 35 performs compression and signal processing on the Y, U, and V signals whose noise is removed, thereby generating a Joint Photographic Experts Group (JPEG) file. The generated JPEG file is displayed on the display unit 25, and is stored in the storage unit 37. The aforementioned operations of the image processing unit 35 are controlled by the digital signal processing unit 39.

The digital signal processing unit 39 photographs a first image whose focus is adjusted, and then photographs a plurality of images by changing movement values of the focus motor 33-3 by referring to the first image. After that, the digital signal processing unit 39 detects an image from among the first image and the plurality of images, wherein the image has the greatest evaluation value of a high frequency component, and adjusts movement of the focus motor 33-3 by as little as a variation value of the focus motor 33-3 with respect to the image having the greatest evaluation value of the high frequency component.

For the aforementioned operations, the digital signal processing unit 39 includes a focus adjusting unit 39-1, a focus motor control unit 39-2, a focus value calculation unit 39-3, and a control unit 39-4.

When the first shutter-release button 11 is input to photograph an image displayed in the display unit 25, the focus adjusting unit 39-1 adjusts a focus of the displayed image. For a live-view image, the focus adjusting unit 39-1 adjusts a focus by using a phase detection system. The phase detection system divides part of a photographic light flux into a pair of light fluxes, forms each of the pair of light fluxes on a line sensor (not shown), and detects a difference value between different directions of two images on the line sensor, thereby calculating a movement direction and a movement distance which are necessary for the focus lens 33-2 so as to focus on a target focus surface.

The control unit 39-4 operates the focus adjusting unit 39-1 when the first shutter-release button 11 is input, operates the photographing unit 33 to photograph an image when the second shutter-release button 11 is input, and then controls an operation of the focus motor control unit 39-2. An image which is first photographed by performing focus adjustment according to the phase detection system is referred to as 'N image'. The N image has a reference movement value with respect to the focus motor 33-3.

In order to determine whether the focus adjustment is accurately performed on the N image, the focus motor control unit 39-2 moves the focus motor 33-3 in a positive (+) direction (a non-finite direction) by as little as a minimum motor movement value, referring to the reference movement value of the N image. When the focus motor 33-3 is moved in the positive direction by as little as the minimum motor movement value, the control unit 39-4 operates the photographing unit 33 to photograph an image. The image which is photographed by moving the focus motor 33-3 in the positive direction is referred to as 'N+1 image'.

After that, the focus motor control unit 39-2 moves the focus motor 33-3 in a negative (−) direction (a near direction) by as little as the minimum motor movement value, referring to the reference movement value of the N image. When the focus motor 33-3 is moved in the negative direction by as little as the minimum motor movement value, the control unit 39-4 operates the photographing unit 33 to photograph an image. The image which is photographed by moving the focus motor 33-3 in the negative direction is referred to as 'N−1 image'.

That is, the control unit 39-4 performs bracket photographing by a single input of the second shutter-release button 11, wherein the bracket photographing obtains the N image, the N+1 image, and the N−1 image. In the current embodiment of the present invention, a total of 3 images are photographed with the single input of the second shutter-release button 11. However, the present invention is not limited thereto, and more images may be photographed with the single input of the second shutter-release button 11.

The focus value calculation unit 39-3 calculates an evaluation value of a high frequency component, that is a focus peak value, from the N−1, N, and N+1 images. At this time, the focus value calculation unit 39-3 applies a focus adjustment algorithm based on a contrast detection system to the N−1, N, and N+1 images, and calculates the focus peak value. The contrast detection system extracts a high frequency component from an image, analyzes a level of the high frequency component by a predetermined sampling interval, and moves the focus lens 33-2 in a direction to which the level of the high frequency component reaches a peak. That is, the focus value calculation unit 39-3 extracts the high frequency component from the N−1, N, and N+1 images, and calculates the focus peak value.

The calculated focus peak value is output to the control unit 39-4, and the control unit 39-4 scans an image having a greatest focus peak value by referring to the calculated focus peak value. As a result of the scan by the control unit 39-4, when the greatest focus peak value is detected from the N image, it is determined that there is no error in focus adjustment via the phase detection system. However, when the greatest focus peak value is detected from one of the N+1 and N−1 images, it is determined that there is an error in the focus adjustment via the phase detection system, so that it is necessary to change the reference movement value with respect to the focus motor 33-3.

However, although the greatest focus peak value is detected from one of the N+1 and N−1 images, it is not possible to determine that a focus of the N+1 image or a focus of the N−1 image is accurately adjusted. Thus, an image from among the N+1 and N−1 images is reset as a reference image that has the detected greatest focus peak value and has the minimum motor movement value with respect to the focus motor 33-3, wherein the minimum motor movement value is stored as an error tolerance value.

For convenience of description, it is assumed that the N+1 image from among the N+1 and N−1 images is the image from which the greatest focus peak value is detected.

Since the N+1 image becomes a reference image, the focus motor control unit 39-2 moves the focus motor 33-3 in the positive direction by as little as the minimum motor movement value, referring to the N+1 image, and the control unit 39-4 operates the photographing unit 33 to photograph an image. The image which is photographed by referring to the N+1 image and moving the focus motor 33-3 in the positive direction is referred to as 'N+2 image'.

Also, the focus motor control unit 39-2 moves the focus motor 33-3 in the negative direction by as little as the minimum motor movement value, referring to the N+1 image, and the control unit 39-4 operates the photographing unit 33 to photograph an image. The image which is photographed by referring to the N+1 image and moving the focus motor 33-3 in the negative direction is referred to as 'the N image'.

The focus value calculation unit 39-3 calculates a focus peak value from the N, N+1, and N+2 images, and outputs the calculated focus peak value to the control unit 39-4. The control unit 39-4 scans an image having a greatest focus peak value by referring to the calculated focus peak value. As a result of the scan by the control unit 39-4, when the greatest focus peak value is detected from the N+1 image, it is determined that there is no error in focus adjustment via the phase detection system. At this time, an error as little as a variation value of the focus motor 33-3 with respect to the N+1 image is accepted as a parameter to be used in adjusting movement of the focus motor 33-3. Thus, an optimal focus point may be automatically detected.

However, when the greatest focus peak value is detected from an image from among the N image and the N+2 image, a reference image is reset as the image from which the greatest focus peak value is detected. After that, until the greatest focus peak value is detected from the reset reference image, a procedure of photographing a new image and calculating a greatest focus peak value is repeated.

It is assumed that the N−1 image from among the N−1, N, and N+1 images is an image from which the greatest focus peak value is detected.

Since the N−1 image becomes a reference image, the focus motor control unit 39-2 moves the focus motor 33-3 in the plus direction by as little as the minimum motor movement value, referring to the N−1 image, and the control unit 39-4 operates the photographing unit 33 to photograph an image. The image which is photographed by referring to the N−1 image and moving the focus motor 33-3 in the positive direction is referred to as the 'N image'.

Also, the focus motor control unit 39-2 moves the focus motor 33-3 in the negative direction by as little as the minimum motor movement value, referring to the N−1 image, and the control unit 39-4 operates the photographing unit 33 to photograph an image. The image which is photographed by referring to the N−1 image and moving the focus motor 33-3 in the minus direction is referred to as the 'N−2 image'.

The focus value calculation unit 39-3 calculates a focus peak value from the N−2, N−1, and N images, and outputs the calculated focus peak value to the control unit 39-4. The control unit 39-4 scans an image having a greatest focus peak value by referring to the calculated focus peak value. As a result of the scan by the control unit 39-4, when the greatest focus peak value is detected from the N−1 image, it is determined that there is no error in focus adjustment via the phase detection system. At this time, an error as little as a variation value of the focus motor 33-3 with respect to the N−1 image is set as a parameter to be used in adjusting movement of the focus motor 33-3. Thus, an optimal focus point may be automatically detected.

However, when the greatest focus peak value is detected from an image from among the N−2 image and the N image, a reference image is reset as the image from which the greatest focus peak value is detected. After that, until the greatest focus peak value is detected from the reset reference image, a procedure of photographing a new image and calculating a greatest focus peak value is repeated.

Figure 4:
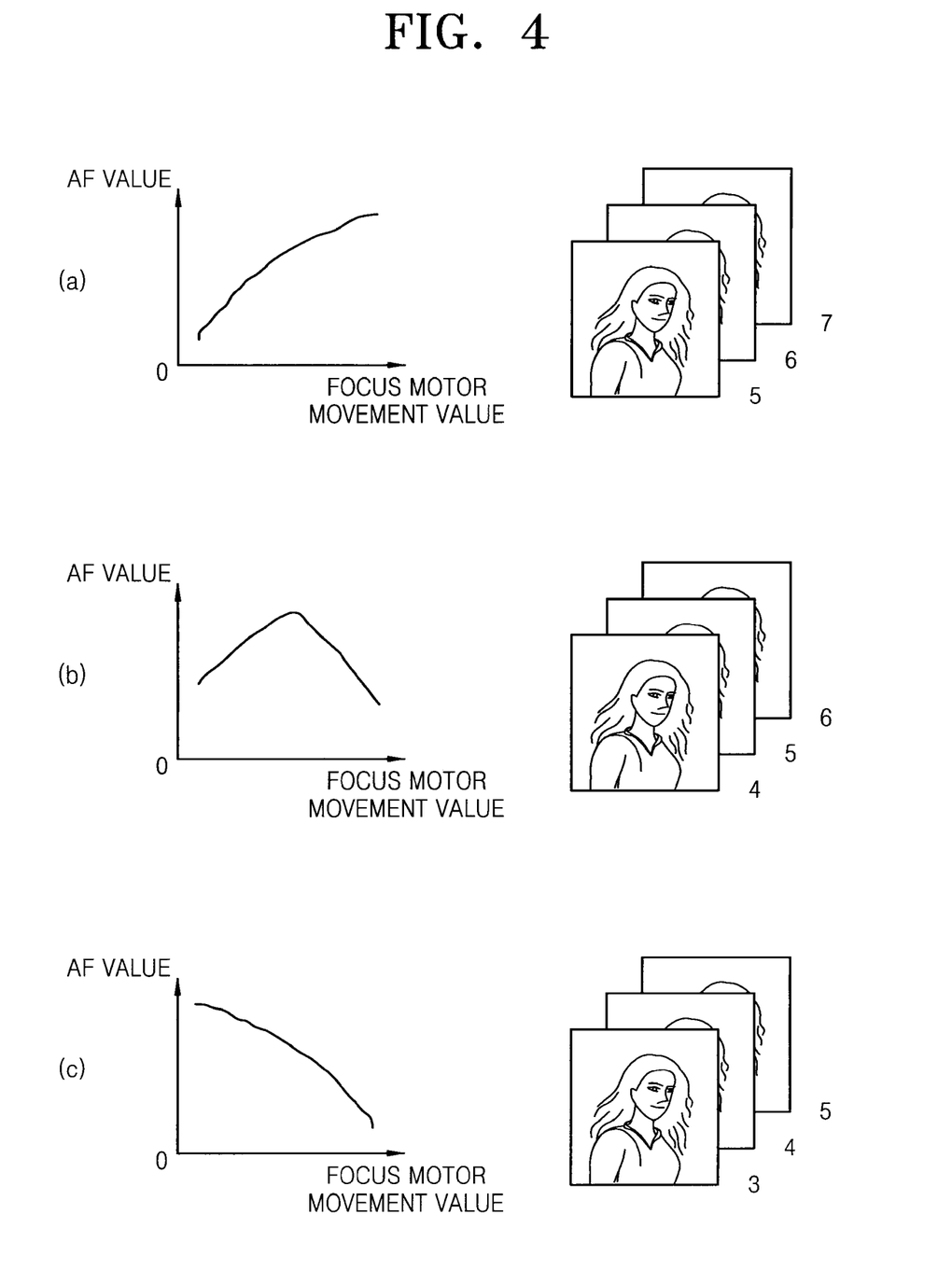
FIG. 4 illustrates focus error adjustment performed by the focus error adjusting apparatus of FIG. 3.

FIG. 4 illustrates focus error adjustment performed by the focus error adjusting apparatus of FIG. 3. In FIG. 4, for convenience of description, a recent distance and a non-finite distance of the focus motor 33-3 are divided into 0 through 10. An image having a reference movement value of the focus motor 33-3 is set as an image 5, and the focus motor 33-3 performs focus adjustment according to a phase detection system. After that, bracket photographing is performed on images 4 and 6 which are adjacent to the image 5, so that a total of 3 images, 4, 5, and 6, are obtained. After a greatest focus peak value is detected in the images 4, 5, and 6 by using a contrast detection method, one of graph (a), (b), and (c) of FIG. 4 is obtained when a focus is easily detected from the images 4, 5, and 6.

In the case where the graph (a) of FIG. 4 is output, the image 6 from among the images 4, 5, and 6 has the greatest focus peak value. Thus, an image 7 is newly obtained by referring to the image 6, and a procedure of photographing a new image and calculating a greatest focus peak value is repeated until the greatest focus peak value is detected from the image 6 from among the images 5, 6, and 7.

In the case where the graph (b) of FIG. 4 is output, a greatest focus peak value is detected from a current reference image that is the image 5 from among the images 4, 5, and 6. Thus, it is determined that the focus adjustment according to the phase detection system is accurate.

In the case where the graph (c) of FIG. 4 is output, the image 4 from among the images 4, 5, and 6 has the greatest focus peak value. Thus, a new image 3 is obtained by referring to the image 4, and a procedure of photographing a new image and calculating a greatest focus peak value is repeated until the greatest focus peak value is detected from the image 4 from among the images 3, 4, and 5.

By performing the aforementioned operations, an error variation value of the focus motor 33-3 is stored. In the case of exchangeable lenses, the error variation value is different according to lenses, so that a separate storage space is necessary for each lens to store the error variation value.

In the case of variable focus lenses (zoom lenses), focus error variation values may be different according to focus distances, so that a storage space is additionally required to store different movement variation values for each focus distance.

The focus error variation value may also be different according to distance between a lens and a target object, so that a storage space may be added to store such a focus error variation value for each distance between a lens and a target object.

Figure 5:
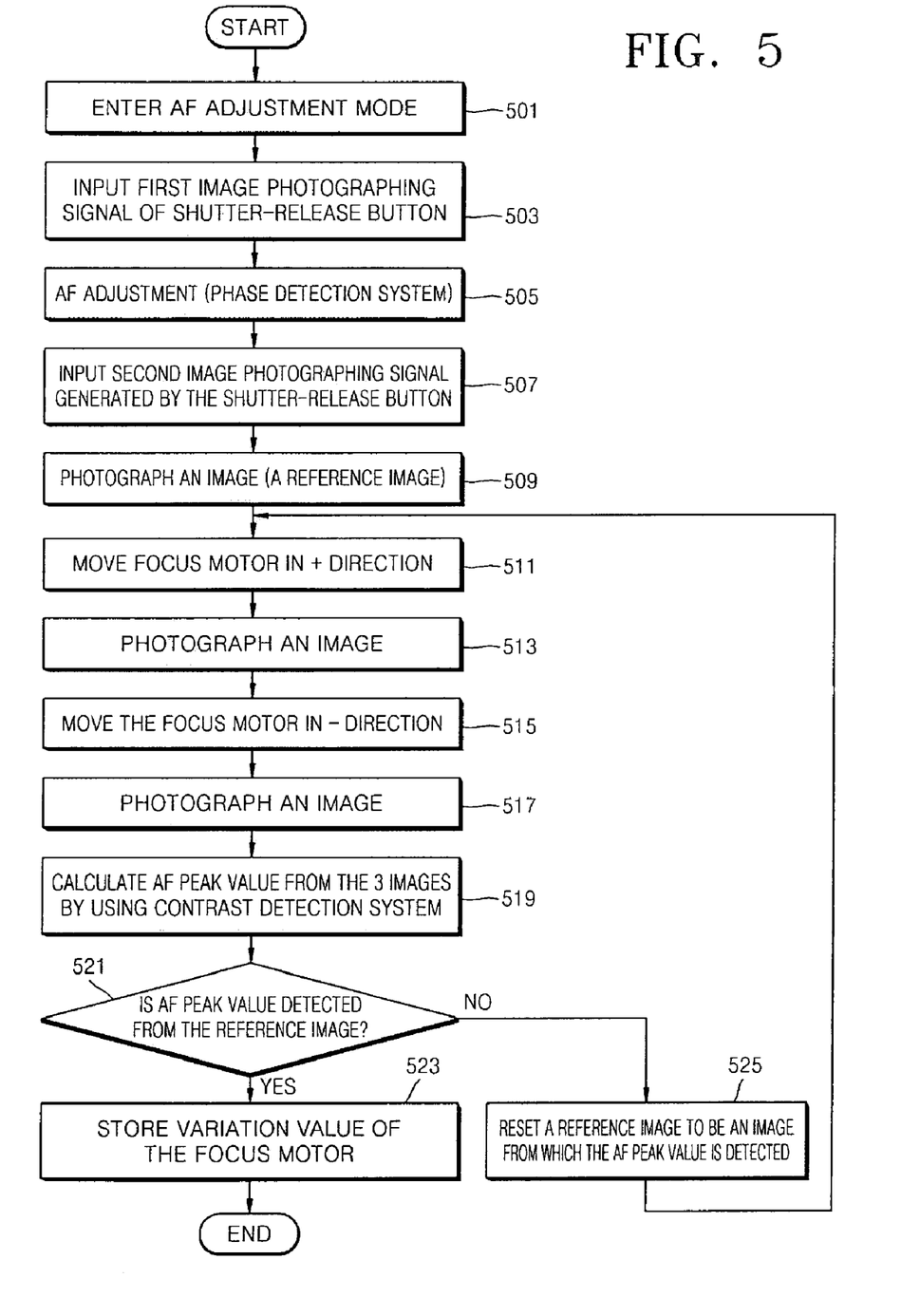
FIG. 5 is a flowchart of a method of adjusting a focus error in a digital image processing device, according to an embodiment of the present invention.

FIG. 5 is a flowchart of a method of adjusting a focus error in a digital image processing device, according to an embodiment of the present invention. The method of adjusting the focus error may be performed in the digital image processing device of FIG. 3. According to other embodiments of the present invention, a main algorithm of the method may be performed in the digital signal processing unit 39 in cooperation with peripheral components in the digital image processing device.

An autofocus (AF) adjustment mode is performed (operation 501), and the digital signal processing unit 39 receives an input of the first shutter-release button 11 for a live-view image (operation 503).

When the input of the first shutter-release button 11 is received, the digital signal processing unit 39 performs AF adjustment on the live-view image (operation 505). For the live-view image, the digital signal processing unit 39 adjusts a focus by using a phase detection system. The phase detection system divides part of a photographic light flux into a pair of light fluxes, forms each of the pair of light fluxes on a line sensor, and detects a difference value between different directions of two images on the line sensor, thereby calculating a movement direction and a movement distance which are necessary for the focus lens 33-2 so as to focus on a target focus surface.

After the AF adjustment is performed on the live-view image, the digital signal processing unit 39 receives an input of the second shutter-release button 11 (operation 507), and operates the photographing unit 33 to photograph an image (operation 509). The image which is first photographed by performing focus adjustment according to the phase detection system is referred to as the "N image". The N image has a reference movement value with respect to the focus motor 33-3.

In order to determine whether the focus adjustment is accurately performed on the N image, the digital signal processing unit 39 moves the focus motor 33-3 in a positive (+) direction by as little as a minimum motor movement value, referring to the reference movement value of the N image (operation 511).

When the focus motor 33-3 is moved in the positive direction by as little as the minimum motor movement value, the digital signal processing unit 39 operates the photographing unit 33 to photograph an image (operation 513). The image which is photographed by moving the focus motor 33-3 in the negative direction is referred to as the 'N+1 image'.

After that, the digital signal processing unit 39 moves the focus motor 33-3 in a negative (−) direction by as little as the minimum motor movement value, referring to the reference movement value of the N image (operation 515).

When the focus motor 33-3 is moved in the negative direction by as little as the minimum motor movement value, the digital signal processing unit 39 operates the photographing unit 33 to photograph an image (operation 517). The image which is photographed by moving the focus motor 33-3 in the negative direction is referred to as 'N−1 image'.

The digital signal processing unit 39 performs bracket photographing when the second shutter-release button 11 is input, so that the N image, the N+1 image, and the N−1 image are obtained. In the current embodiment of the present invention, a total of 3 images are photographed when the second shutter-release button 11 is input. However, the present invention is not limited thereto, and more images may be photographed when the second shutter-release button 11 is input.

After that, the digital signal processing unit 39 calculates a focus peak value from the N−1, N, and N+1 images, by using a contrast detection method (operation 519). The contrast detection method extracts a high frequency component from an image, analyzes a level of the high frequency component by a predetermined sampling interval, and moves the focus lens 33-2 in a direction to which the level of the high frequency component reaches a peak. That is, the digital signal processing unit 39 extracts the high frequency component from the N−1, N, and N+1 images, and calculates the focus peak value.

The digital signal processing unit 39 scans an image having the greatest focus peak value, and determines whether the greatest focus peak value is detected from the N image that is a reference image (operation 521).

As a result of the determination by the digital signal processing unit 39, when the greatest focus peak value is detected from the N image that is the reference image, it is determined that there is no error in the focus adjustment via the phase detection system, and a variation value of the focus motor 33-3 with respect to the N image is stored (operation 523).

However, as a result of the determination by the digital signal processing unit 39, when the greatest focus peak value is not detected from the N image that is the reference image, an image from which the greatest focus peak value is detected is reset as a reference image (operation 525). After that, operations 511 through 525 are repeated.

When the greatest focus peak value is detected one of the N+1 and N−1 images, it is determined that there is an error in the focus adjustment via the phase detection system, and thus it is necessary to change the reference movement value with respect to the focus motor 33-3.

However, although the greatest focus peak value is detected from one of the N+1 and N−1 images, it is not possible to determine that a focus of the N+1 image or a focus of the N−1 image is accurately adjusted. Thus, an image from among the N+1 and N−1 images is reset as a reference image that has the detected greatest focus peak value and has the minimum motor movement value with respect to the focus motor 33-3, wherein the minimum motor movement value is stored as an error tolerance value.

For example, it is assumed that the N+1 image from among the N−1, N, and N+1 images is the image from which the greatest focus peak value is detected.

Since the N+1 image becomes a reference image, the digital signal processing unit 39 moves the focus motor 33-3 in the positive direction by as little as the minimum motor movement value, referring to the N+1 image, and operates the photographing unit 33 to photograph an image. The image which is photographed by referring to the N+1 image and moving the focus motor 33-3 in the plus direction is referred to as the 'N+2 image'.

Also, the digital signal processing unit 39 moves the focus motor 33-3 in the negative direction by as little as the minimum motor movement value, referring to the N+1 image, and operates the photographing unit 33 to photograph an image. The image which is photographed by referring to the N+1 image and moving the focus motor 33-3 in the minus direction is referred to as the 'the N image'.

The digital signal processing unit 39 calculates a focus peak value from the N, N+1, and N+2 images, and scans an image having the greatest focus peak value. As a result of the scan by the digital signal processing unit 39, when the greatest focus peak value is detected from the N+1 image, it is determined that there is no error in focus adjustment via the phase detection system. At this time, an error as little as a variation value of the focus motor 33-3 with respect to the N+1 image is set as a parameter to be used in adjusting movement of the focus motor 33-3. Thus, an optimal focus point may be automatically detected.

However, when the greatest focus peak value is detected from an image from among the N image and the N+2 image, a reference image is reset as the image from which the greatest focus peak value is detected. After that, until the greatest focus peak value is detected from the reset reference image, a procedure of photographing a new image and calculating the greatest focus peak value is repeated.

According to the present invention, a focus error due to the phase detection system can be adjusted using the contrast detection method. By doing so, the focus error can be easily and accurately adjusted when the digital image processing device is manufactured or used.

While this invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A focus error adjusting apparatus for use in a digital image processing device, the focus error adjusting apparatus comprising:
   a photographing unit comprising a focus motor and an image sensor to capture a first image whose focus is adjusted via a phase detection system, and a second image by changing movement values of the focus motor by referring to the first image; and
   a digital signal processing unit comprising a control unit that receives the first image and the second image from the image sensor, evaluates the first image and the second image to detect respective high-frequency components by applying a focus adjustment algorithm based on a contrast detection system, and sends an output control signal to the focus motor to correct a focus error associated with the digital image processing device based on the image having the larger high-frequency component, wherein when the first image has a greater high-frequency component than the second image, a correction of the position of the focus lens is determined to be 0, and the focusing adjusting is ended.

2. The focus error adjusting apparatus of claim 1, wherein the high-frequency components are evaluated by a dedicated focus value calculation unit within the digital signal processing unit.

3. The focus error adjusting apparatus of claim 1, wherein the output control signal to correct the focus error is supplied to the photographing unit by a dedicated focus motor control unit within the digital signal processing unit.

4. A focus error adjusting apparatus for use in a digital image processing device, the focus error adjusting apparatus comprising:
   a means for photographing a first image whose focus is adjusted via a phase detection system, and a plurality of images by changing movement values of a focus motor by referring to the first image; and
   a means for digital signal processing by outputting a focus motor control signal to the means for the photographing, detecting a second image having the greatest evaluation value of a high frequency component from among the first image and the plurality of images by applying a focus adjustment algorithm based on a contrast detection system, and controlling the focus motor to correct a focus error associated with the means for digital signal processing based on the second image having the greatest evaluation value of the high frequency component, wherein, when the second image having the greatest evaluation value of the high frequency component is the first image, the means for digital signal processing does not control the focus motor to correct the focus error, and wherein, when the second image having the greatest evaluation value of the high frequency component is not the first image, the means for digital signal processing controls the focus motor to move the focus lens by at least a smallest non-zero controllable movement increment implemented by the focus motor with respect to the second image having the greatest evaluation value of the high frequency component.

5. The focus error adjusting apparatus of claim 4, wherein the means for digital signal processing controls the focus motor to move the focus lens in a direction and an opposite direction relative to the in-focus position associated with the first image, and outputs a control signal to the means for photographing which photographs the plurality of images.

6. The focus error adjusting apparatus of claim 4, wherein the means for digital signal processing outputs a control signal by which the focus motor moves the focus lens by at least a smallest non-zero controllable movement increment implemented by the focus motor.

7. The focus error adjusting apparatus of claim 4, wherein the greatest evaluation value of the high frequency component corresponds to a focus peak value calculated using a contrast detection method with respect to the first image and the plurality of images.

8. The focus error adjusting apparatus of claim 7, wherein the means for digital signal processing comprises:
   a focus adjusting unit for acquiring a focus of the first image;
   a focus motor control unit for controlling movement of the focus lens;
   a focus value calculation unit for calculating the focus peak value from the first image and the plurality of images; and
   a control unit for controlling the focus motor to move the focus lens by the at least the smallest non-zero controllable movement increment implemented by the focus motor with respect to the second image having the greatest focus peak value when the second image having the greatest focus peak value is not the first image.

9. The focus error adjusting apparatus of claim 8, wherein the control unit resets a reference image to be the second image having the greatest focus peak value, controls photographing of a third image by changing control parameters of the focus motor by referring to the reset reference image, and controls the focus motor to move the focus lens by the at least the smallest non-zero controllable movement increment implemented by the focus motor with respect to the second image having the greatest focus peak value.

10. The focus error adjusting apparatus of claim 9, wherein the control unit repeats the reset of the reference image, and repeats the photographing of the third image according to the control parameters of the focus motor, until the third image having the greatest focus peak value becomes the reference image.

11. A method of adjusting a focus error in a digital image processing device, the method comprising:
   (a) photographing a first image whose focus is adjusted via a phase detection system;
   (b) photographing a plurality of images by controlling a focus motor to move the focus lens relative to the in-focus position associated with the first image;
   (c) detecting a second image having the greatest evaluation value of a high frequency component from among the first image and the plurality of images by applying a focus adjustment algorithm based on a contrast adjustment system; and;
   (d) controlling the focus motor to move the focus lens by at least a smallest non-zero controllable movement increment implemented by the focus motor with respect to the second image having the greatest evaluation value of the high frequency component to correct the focus error in the digital image processing device, wherein in (d), when the second image having the greatest evaluation value of the high frequency component is the first image, a correction of the position of the focus lens is determined to be 0, and the controlling of the focus motor is ended.

12. The method of claim 11, wherein (b) comprises:
   (b-1) controlling the focus motor to move the focus lens in a direction relative to the in-focus position, and photographing a third image; and
   (b-2) controlling the focus motor to move the focus lens in an opposite direction relative to the in-focus position, and photographing a fourth image, the plurality of images including the third and fourth images.

13. The method of claim 11, wherein (c) comprises using a contrast detection method with respect to the first image and the plurality of images, and detecting the second image having the greatest evaluation value of a high frequency component.

14. The method of claim 11, wherein, when the second image having the greatest evaluation value of the high frequency component is not the first image, (d) comprises:
   (d-1) resetting a reference image to be the second image having the greatest evaluation value of the high frequency component;
   (d-2) photographing a third image by changing a position of the focus lens relative to the reset reference image; and
   (d-3) controlling the focus motor to move the focus lens by the at least a smallest non-zero controllable movement increment implemented by the focus motor relative to the reference image having the greatest evaluation value of the high frequency component.

15. The method of claim 14, wherein (d-1) and (d-2) are repeated until the third image having the greatest evaluation value of the high frequency component becomes the reference image.

16. The focus error adjusting apparatus of claim 1, wherein the focus error associated with the digital image processing device is associated with a focus adjusting unit of the digital image processing device.

17. The focus error adjusting apparatus of claim 1, wherein the focus error is due to at least one of a manufacturing defect, a manufacturing tolerance, or a mechanical shock.

18. The focus error adjusting apparatus of claim 1, wherein the first and second images are of a first subject, and wherein correcting the focus error associated with the digital image processing device increases focus accuracy when focusing on a second subject at a later time.

* * * * *